United States Patent [19]

Clearfield

[11] 4,180,551
[45] Dec. 25, 1979

[54] MODIFIED ZIRCONIUM PHOSPHATES

[75] Inventor: Abraham Clearfield, Athens, Ohio

[73] Assignee: Texas A&M University System, College Station, Tex.

[21] Appl. No.: 830,937

[22] Filed: Sep. 6, 1977

Related U.S. Application Data

[60] Division of Ser. No. 494,579, Aug. 5, 1974, Pat. No. 4,059,679, which is a continuation of Ser. No. 132,569, Apr. 8, 1971, abandoned.

[51] Int. Cl.$^2$ ............... C01F 13/00; C01B 15/16; C01B 25/26
[52] U.S. Cl. ............... 423/249; 423/305; 423/306
[58] Field of Search ............... 423/305, 263, 593, 595, 423/601, 602, 606, 607, 608, 617; 42/351, 358, 252, 253, 306, 249

[56] References Cited

PUBLICATIONS

Chem. Abstracts, vol. 71, 116877m.
Chem. Abstracts, vol. 72, 70958d.
Chem. Abstracts, vol. 73, 59687q.
Chem. Abstracts, vol. 74, 46568d.

Primary Examiner—O. R. Vertiz
Assistant Examiner—Gregory A. Heller
Attorney, Agent, or Firm—Bertram I. Rowland

[57] ABSTRACT

A process for modifying various inorganic compounds defined by the formula:

$$M(OH)_z(HQO_4)_{2-z/2}.xH_2O$$

wherein M is a metal ion selected from Groups IVA and IVB of the Periodic Table of Elements, Q is an anion selected from Groups VA and VIB of the Periodic Table of Elements, z is any value from 0 to 2 and x is a number of from 0 to 8, by replacing a hydrogen in the inorganic compound with a metal cation. Suitable cations include those elements selected from Groups IA, IIA, IIIA, IVA, IB, IIB, IIIB including the lanthanide and activide series, IVB, VB, VIB, VIIB and VIII of the Periodic Table of Elements and ammonium. Thereafter, elevation of the temperature causes modification of the crystalline structure of the exchanged compound and provides various novel crystalline phases. Substitution of dissimilar metal cations for those present in the heat modified structure, with or without subsequent washing with acid, or washing out of the original metal cations, creates still other crystalline phases.

7 Claims, No Drawings

MODIFIED ZIRCONIUM PHOSPHATES

CROSS-REFERENCE TO RELATED APPLICATIONS

This application is a divisional application of U.S. patent application Ser. No. 494,579 filed Aug. 5, 1974 now U.S. Pat. No. 4,059,679 which was a continuation of U.S. patent application Ser. No. 132,569 filed Apr. 8, 1971, now abandoned.

BACKGROUND OF THE INVENTION

This invention relates to novel inorganic crystalline structures and their method of preparation.

When solutions of certain metals such as those found in Groups IVA and IVB of the Periodic Table of the Elements are mixed with oxyanions of elements found in Groups VA and VIB of the Periodic Table of Elements, amorphous gels having limited ion exchange characteristics are precipitated. Certain of these gels have been converted into stoichiometric crystalline phases by refluxing in a solution of a strong acid. Among the crystalline phases prepared in this manner are α-zirconium phosphate (hereinafter designated α-ZrP); see U.S. Pat. No. 3,416,884; and β and γ-zirconium phosphates (hereinafter designated β-ZrP and γ-ZrP, respectively), see *Journal of Inorganic Nuclear Chemistry*, 1968, Vol. 30, pages 2249–2258, Pergamon Press.

Such compounds have limited catalytic uses while exhibiting some degree of zeolitic (absorption) characteristics and poor temperature stability. Thus, heating of such compounds, such as up to 100° C., removes the water of hydration without destroying the interlayer structure of the compounds. However, additional heating to higher temperatures causes condensation to occur with attendant breakdown in the crystalline structure and the ultimate creation of amorphous substances generally lacking in both zeolitic and catalytic characteristics.

It has now been found that through preliminary displacement of a replaceable hydrogen ion in the inorganic crystalline structure by a metal cation, (hereinafter sometimes referred to as ion exchange), the aforementioned high temperature instability is eliminated. In this manner, various structural changes can be accomplished in the inorganic crystal lattice without ultimate destruction of the crystalline nature of the compound. More specifically, when crystalline compounds of the formula:

$$M(OH)_z(HQO_4)_{2-z/2} \cdot xH_2O \qquad (1)$$

wherein M is a metal ion, Q is an anion, z is any value from 0 to 2 and x is an integer of from 0 to 8, and preferably from 1–5, are reacted (neutralized) with a cation, the resulting compounds have been found to retain a definite crystalline structure even when subjected to temperatures in excess of that necessary to drive off the water of hydration.

Typical metal ions intended to be included in the above-identified formula (1) as M are metal ions comprising elements selected from Groups IVA and IVB of the Period Table of Elements are disclosed on pages 392 and 393 of the *Handbook of Chemistry and Physics*, 35th Edition. Specific examples of suitable metal ions include silicon, germanium, tin, lead, titanium, zirconium, cerium, thorium, and hafnium. With respect to the anions set forth as Q in the aforementioned formula (1), suitable elements include those found in Groups VA and VIB of the aforementioned periodic Table of Elements. Typical examples of such materials include phosphorous, arsenic, antimony, bismuth, chromium, molybdenum and tungsten.

Although it sometimes happens that (HQO$_4$) groups are replaced by hydroxyl groups to form compounds as defined by equation (1), preferred starting materials are free of hydroxyl groups, i.e., those where z is 0, wherein the formula is $$M(HQO_4)_2 \cdot xH_2O \qquad (2)$$

wherein M, Q and x have the definitions set forth above.

Although it is not intended that this invention be limited to any specific theoretical concept, it appears that replacing at least some of the replaceable hydrogen ions of the crystal lattice of the compounds of equation (1) with metal cations produces compounds of the following formula:

$$M(OH)_z Y_{t}^{m+}(QO_4)_{2-z/2} \cdot xH_2O \qquad (3)$$

wherein m+ is an integer corresponding to the charge of the cation Y, t is a number such that mt=2−z/2, M, Q, z and x have the aforementioned definitions and Y is selected from hydrogen, ammonium, cations such as those found in Groups IA, IIA, IIIA, IVA, IB, IIB, IIIB including the lanthanide and actinide series, IVB, VB, VIB, VIIB, and VIII of the aforementioned Periodic Table of Elements, and mixtures thereof. Where Y is a mixture of cations, the term $Y_t^{m+}$ will be understood to include $Y_a^{m+} W_b^{n+}$ wherein m+ is the charge of cation Y and n+ is the charge of dissimilar cation W so that am+nb equals 2−z/2 in equation (3). When b equals 0, equation (3) is applicable.

Again, with respect to preferred starting materials free of hydroxyl groups, formula (3) would be as follows:

$$MY_{t}^{m+}(QO_4)_2 \cdot xH_2O \qquad (4)$$

wherein t' is a number such that mt'=2 and M, Y, Q, x and m are defined as set forth above.

Typical of the aforementioned cations are such elements as lithium, beryllium, sodium, magnesium, potassium, calcium, rubidium, strontium, titanium, cesium, maganese, molybdenum, barium, scandium, copper, zinc, chromium, aluminum, iron, cobalt, nickel, silicon, vanadium, lanthanum and actinium as well as the lanthanum and actinium series. Preferred are metal cations selected from the group consisting of alkali metals and alkaline earth metals, and having atomic numbers of at least 3 but not more than 20.

The aforementioned displacement reaction of this invention can be accomplished either through dry ion exchange, aqueous ion exchange, or through liquid-solid exchange with liquids such as titanium or tin tetrachloride or with metal salts dissolved in organic liquids. When the process employs dry ion exchange, it is not encumbered by the limitations present with aqueous ion exchange. Thus, it has been found that both anhydrous and hydrated salts can react directly in the solid state with the crystalline compounds defined by equations (1) and (2).

Thereafter, subsequent high temperature treatment of the exchange crystalline structure represented by formulas (3) and (4) apparently only releases the water of hydration from the ion exchange compounds. The condensation reaction (during which water would normally be split out of the compound) is thereby eliminated. The resulting compounds have been found to have characteristics similar to that of a molecular sieve material. Thus, depending upon the particular interlayer spacing, various cations can either be included or excluded. For this reason, it has now been found possible, by using the novel crystalline structures of this invention, to readily separate such molecules as water, amines, alcohols and the like from hydrocarbon solvents.

In still another aspect of the invention, it has been found that, depending upon the extent to which the initial ion exchange is accomplished, and furthermore depending upon the intensity of the heat treatment of the resulting ion exchange compounds, a plurality of phases of crystalline compounds can be produced, each having its own interlayer structure and x-ray diffraction pattern. For example, by partial replacement with one cation, followed by heat treatment to alter the structure and subsequent replacement of the first cation with a second dissimilar cation, various structures having properties not directly attainable by initial ion exchange are produced. Still further, washing out of the cations following the heat treatment leads to additional forms of crystalline compounds.

Summarizing the process of the present invention, the starting material can be any of the compounds encompassed by formula (1), above, whether in their known crystalline forms or, as has been found possible with α-ZrP, in an amorphous gel form. The initial step involves an exchange of metal cations for the replaceable hydrogen ions present in these compounds. It will be readily apparent to one skilled in this art that the exchange can be employed to replace all of the hydrogen ions present or only a small percentage such as about 10 to 20 percent. If the neutralization reaction is accomplished in an aqueous solution, ion exchange may be less than complete, i.e., less than 100 percent of theoretical exchange is accomplished. As a result, heating then produces mixtures of phases that appear to represent ½ (1 hydrogen replaced per molecule) and full exchange (both hydrogens exchanged in some molecules). It has also been found that the most useful metal cations for aqueous ion exchange are those elements classified in Groups IA, IIA, IIB and VIIB of the Periodic Table of the Elements.

In another aspect, it will be appreciated that the extent of ion exchange (cation loading), can be varied from zero to full exchange by starting either with the acid form or alternatively with the cation form and washing with an acid. Thereafter, the exchanged crystalline compound is heat-treated, first to remove any water of hydration, and thereafter to form new crystalline phases. Once any of the new crystalline phases are obtained, all or part of the first metal cation can be replaced with a second metal cation. For example, Li+ and Na+ forms of the exchangers are particularly useful for secondary replacement. Thereafter, any of the heat treated crystalline phases can be used as catalysts or ion exchange compounds. Furthermore, by washing out the cations used to retain the crystalline structure during the heat treatment, structures having highly desirable absorption characteristics (similar to molecular sieves) can be obtained.

By way of specific embodiment, the remainder of this disclosure is primarily directed to procedures for producing and creating novel phases, through ion exchange and treating, of various compounds and particularly crystalline zirconium phosphates (ZrP), such as prepared in the aforementioned publications, and especially α-ZrP, as prepared in U.S. Pat. No. 3,416,884. It will be readily apparent to one skilled in this art that the zirconium phosphates are merely representative of the compounds that can be obtained with any of the other metal ions, anions and metal cations set forth in formulas (1) and (2). For instance, Example IV E illustrates the modification of hydrated titanium phosphate; Example IV B the stabilization of hydrated zirconium arsenate while Example III A illustrates the preparation of a hydrated zirconium arsenate; and Example IIIB a hydrated tin phosphate.

To further illustrate the process of this invention, the following examples are provided. It should be understood that the details thereof are not to be regarded as limitations as they may be varied as will be appreciated by one skilled in this art.

EXAMPLE I

Preparation of α, β and γ-ZrP

A. α-ZrP One hundred grams of zirconium phosphate gel obtained by the addition of zirconyl chloride solution to orthophosphoric acid was dispersed in 200 ml. of water by vigorous agitation. The resultant slurry was added to 1600 ml. of concentrated orthophosphoric acid. The diluted slurry, which had a molarity of 13 with respect to phosphoric acid, was refluxed for one hour. A sample was then removed and the solid matter of the sample was filtered off, washed to remove soluble impurities, and dried below 100° C. with $P_2O_5$. When examined by X-ray diffraction this solid matter was found to be highly crystalline. Refluxing of the rest of the slurry was continued for 24 hours and another sample was taken. The solid material in the second sample showed the same X-ray diffraction pattern as the first one. Analysis of the product showed $ZrO_2$, 40.8%, $P_2O_5$, 46.6%, and $H_2O$, 12.4%, corresponding to $Zr(HPO_4)_2.H_2O$.

B. β-ZrP 100 ml of 10 M $ZrOCl_2.8H_2O$ was added dropwise to a constantly stirred, refluxing phosphate solution, which had been prepared by dissolving 2 moles (276 g) of $NaH_2PO_4.H_2O$ in 200 ml of 3 M HCl. (The latter solution was heated to reflux temperature to effect complete dissolution of the sodium dihydrogen phosphate in the hydrochloric acid at the concentration levels specified). The zirconium phosphate gel, which precipitated immediately, was refluxed in its mother liquor for 25 hrs. The resulting crystalline zirconium phosphate was filtered off with suction using a very retentive, acid hardened filter paper. It was then washed on the filter: first with 2 M hydrochloric acid to the removal of sodium ion (several liters were required), then with 0.2 M phosphoric acid to the removal of chloride ion (about one liter was required), and finally with several small volumes of distilled, deionized water. The product was then very thoroughly dried at room temperature in an aspirator-evacuated vacuum dessicator over anhydrous calcium sulfate for several weeks. Analysis: Found for $ZrO_2$—43.56%, $P_2O_5$—49.03% Loss on Ignition—7.41%. Calculated for $Zr(HPO_4)_2$: $ZrO_2$—43.72%; $P_2O_5$—49.94%; Loss on Ignition, 6.34%.

C. γ-ZrP This hydrated form of β-Zirconium phosphate is obtained by repeating the procedure of Example IB, but air-drying rather than vacuum drying over a suitable drying agent such as $P_2O_5$. Analysis: Found for $ZrO_2$—38.57%; $P_2O_5$—43.98%; $H_2O$—17.5%. Calculated for $Zr(HPO_4)_2.2H_2O$: $ZrO_2$—38.60%; $P_2O_5$—44.47%; $H_2O$—16.93%.

Alternately, if β-Zirconium phosphate is contacted by water, it will absorb water until the composition $Zr(HPO_4)_2.2H_2O$ is obtained. The X-ray diffraction patterns of α-ZrP, β-ZrP and γ-ZrP are compared in the following Table I, and demonstrates that these separate and distinct phases have entirely different structures.

TABLE I

X-ray Powder Patterns of the Different Crystalline Phases of Zirconium Phosphate

| α-ZrP | | β-ZrP | | γ-ZrP | |
|---|---|---|---|---|---|
| d (Å) | $I/I_o$ | d (Å) | $I/I_o$ | d (Å) | $I/I_o$ |
| 7.56 | 75 | 9.4 | 90 | 12.2 | 90 |
| 4.48 | 40 | 5.40 | 100 | 5.81 | 100 |
| 4.44 | 25 | 4.65 | 50 | 4.62 | 35 |
| 3.57 | 100 | 3.83 | 20 | 4.35 | 35 |
| 3.53 | 55 | 3.56 | 85 | 3.74 | 45 |
| 3.29 | 5 | 3.30 | 90 | 3.31 | 90 |
| 3.21 | 10 | 3.12 | 40 | 3.20 | 35 |
| 3.08 | 5 | 2.69 | 50 | 2.68 | 35 |
| 3.02 | 2 | 2.15 | 25 | 2.17 | 20 |
| 2.64 | 30 | | | | |
| 2.62 | 35 | | | | |
| 2.48 | 5 | | | | |
| 2.41 | 10 | | | | |
| 2.34 | 5 | | | | |
| 2.27 | 2 | | | | |
| 2.22 | 2 | | | | |
| 2.19 | 5 | | | | |
| 2.17 | 5 | | | | |

α-ZrP has a layered structure, the layers consisting of zirconium atoms lying in a plane held together by phosphate groups above and below the plane. The layers are arranged relative to each other in a staggered fashion such as to form Zeolitic cavities. Thus, α-ZrP exhibits sieving behavior. Cesium and rubidium ions are not exchanged in acid solution but $Na^+$, $K^+$, and $Li^+$ are exchanged under such conditions.

β-ZrP has the same layered structure as α-ZrP but the layers are arranged differently relative to each other. Instead of being staggered they are directly over one another. This produces larger cavities and ion exchange behavior separate and distinct from that of α-ZrP. On heating α-ZrP to 100° C. it loses a mole of water so that its composition becomes the same as that of β-ZrP. However, its X-ray pattern remains unaltered (excpet for line broadening) indicating no change in structure.

When β-ZrP comes in contact with water, sorption of 2 moles of water takes place with concomitant increase in interlayer spacing. In this respect it behaves as a claylike substance. The resultant γ-phase is the one actually taking part in exchange reactions in aqueous solution and is able to sorb large ions such as $Cs^+$, $Rb^+$, $Ba^{++}$. However, a real distinction can be made between the β- and γ-phases. The β-phase acts as a drying agent whereas the γ-phase does not.

EXAMPLE II

Comparison of Adsorption Characteristics of β- and γ-Zrp.

A. Six grams of β-ZrP was placed inside the lower portion of a dessicator. A sample of sodium oxalate which had been exposed to moisture so that it contained 1–2% water was sealed inside the dessicator overnight. A portion of the oxalate was then weighed out, dissolved in dilute sulfuric acid (250 ml containing 12 ml acid) and titrated with a standardized solution of potassium permanganate. The weighed sample was shown to be 99.98% pure, and hence, essentially all its water had been removed by the β-ZrP. When the experiment was repeated using γ-ZrP as dessicant, the sample contained 98.91% sodium oxalate and 1.09% $H_2O$ showing that γ-ZrP was ineffective in removing the water.

B. 500 ml of benzene was shaken with 100 ml of water so as to saturate it with water. The benzene layer was then separated from the aqueous layer in a separatory funnel. To the wet benzene was added 1 g of β-ZrP and the mixture shaken continuously for 1 hour in a stoppered bottle. The solid was then filtered off and x-rayed. Its x-ray pattern was that of γ-ZrP showing that close to 0.12 g of water were removed from the benzene.

C. Sodium and cesium ions are readily exchanged by γ-ZrP at roughly the same pH and give a sharp endpoint at 3.53 meg/g of dry exchanger weighed as β-ZrP. This is equivalent to the exchange of 1 mole of cation for 1 mole of hydrogen ion. The corresponding titration curves for α-ZrP are shown in FIG. 2. α-ZrP exchanges 2 moles of sodium ion but does not exchange cesium ion in acid solution. These results are a consequence of the structures as described earlier. γ-ZrP having a very open structure exchanges large as well as small cations but α-ZrP only exchanges ions with a radius of less than 1.33 Å.

These exchange properties can effectively be used to separate large radioactive ions from various ion mixtures. For example, long lived Cs and Ba isotopes can be separated from radioactive wastes as follows: The waste liquor is adjusted to a pH of 4–5. It is then passed over a column of α-ZrP where all ions having a radius of 1.33 Å or less are removed. The effluent is then passed over a suitable column of γ-ZrP to remove cesium and barium ions.

When α-ZrP is heated to 100° C. it loses 1 mole of water but does not undergo a change in its X-ray diffraction pattern. Furthermore, its ion exchange capacity remains unchanged.

EXAMPLE III

Preparation of Compounds Other than ZrP

A. Zirconium Arsenate To 0.2 mole of arsenic pentoxide dissolved in 300 ml of concentrated nitric acid was added 0.1 mole of zirconyl nitrate, $ZrO(NO_3)_2.4H_2O$, dissolved in 85 ml of concentrated nitric acid. The mixture was refluxed for 24 hours, cooled and the white crystalline solid filtered off. It was then washed with a 1% $As_2O_5$ solution 5 times and finally twice with distilled water. The solid was then dried over $P_2O_5$ until it attained a constant weight. Analysis gave 31.30% of $ZrO_2$ and 58.10% $As_2O_5$ which corresponds to the formula $Zr(HAsO_4)_2.H_2O$. The x-ray diffraction pattern of these crystals showed that the compound is isomophous with α-ZrP. Therefore, it will hereinafter be characterized as α-ZrAs.

B. Tin Phosphate 35 g of $SnCl_4.5H_2O$ was dissolved in 250 ml of water and added to 250 ml of 3 M phosphoric acid with stirring. Then 0.8 M NaOH was added until a precipitate formed. The mixture was boiled and the precipitate which formed was filtered off and added to 500 ml of 6 M phosphoric acid and refluxed for 24 hours. The solid was filtered off, washed several times with distilled water and air dried overnight. The product was essentially amorphous showing only a few indistinct peaks when exposed to x-radiation. Analysis was close to the composition $SnO_2.P_2O_5.4H_2O$. However, the water content tended to vary from preparation to preparation.

EXAMPLE IV

Stabilization of Inorganic Crystalline Compounds

A. α-ZrP with Sodium Ions

1. To 1.0 gram of α-ZrP is added 100 ml of 0.1 N NaCl, then 0.1 M NaOH is added in small increments while monitoring the pH. When 33.2 ml of 0.1 M NaOH is added a first endpoint is reached, i.e., the replacement of 1 replaceable hydrogen ion. The composition of the solid at this point was found to be $Zr(NaPO_4)(HPO_4).5H_2O$. This phase was designated phase A ($Na^+.5H_2O$) and its composition was found to be 23.15% Zr, 47.18% $PO_4$, 5.79% Na, 25.11% $H_2O$ (determined as loss of ignition). Calculated for $Zr(NaPO_4)(HPO_4).5H_2O$: 23.28% Zr, 47.93% $PO_4$, 5.80% Na, 25.00% $H_2O$.

Phase A ($Na^+.5H_2O$) was heated at 110° C. for four hours whereupon it lost 22.93% (5 moles $H_2O$) by weight and formed the anhydrous compound $Zr(NaPO_4)(HPO_4)$ designated phase C ($Na^+$). This compound was found to be stable to 200° C. and as such was useful as a catalyst up to this and somewhat higher temperatures. Phase A ($Na^+.5H_2O$) was found to have an interlayer spacing of 11.8 Å, while phase C ($Na^+$) exhibited an interlayer spacing of 7.33 Å.

2. To 1.00 g of α-ZrP is added 50 ml of 0.1 N NaCl solution and then 66.4 ml of 0.100 N NaOH solution slowly and with stirring over an 8-hour period. The final mixture was stirred until no further change in pH was obtained. This quantity is equivalent to the amount of NaOH required to achieve the second endpoint; replacement of both replaceable hydrogen ions. The solid was then filtered off and allowed to achieve a constant weight at 52% relative humidity. Analysis gave 24.07% Zr, 12.04% Na, 49.77% $PO_4$, 14.18% $H_2O$. Calculated for $Zr(NaPO_4)_2.3H_2O$: 24.13% Zr, 12.03% Na, 49.69% $PO_4$, 14.14% $H_2O$. This solid was designated phase D ($2Na^+.3H_2O$); interlayer spacing −9.83Å. When phase D was heated at 165° C. for 4 hours it lost its water content to form $Zr(NaPO_4)_2$ designated phase F($2Na^+$); interlayer spacing −8.38 Å. This phase was useful as a catalyst up to temperatures of about 400° C. whereupon it converted to a form designated phase G($2Na^+$); interlayer spacing −7.63 Å. This phase was stable to 800° C. and useful as a catalyst from room temperature to 750° C. since it was found not to revert to phase F on cooling. Heating phase G to 800°–900° C. converts it to a form designated phase H($2Na^+$, interlayer spacing −7.60 Å, which was found to be stable from 0°–900° C. and useful as a catalyst throughout that temperature range.

3. To 1.0 g of α-ZrP was added 50 ml 0.1 N NaCl as supporting electrolyte. Then 8.3 ml of 0.10 N NaOH is added dropwise and stirred until the pH achieved a constant value (~3). The solid was then filtered off and an x-ray pattern of the wet solid taken. The pattern showed the presence of approximately 25% phase A ($Na^+.5H_2O$) and 75% unexchanged α-ZrP. On heating to 225° C. for 6 hours a totally new phase is obtained rather than a mixture of dehydrated phase A and dehydrated α-ZrP, as shown by the x-ray diffraction pattern below.

| X-ray powder pattern of a mixture of phase A($Na^+.5H_2O$)+α-ZrP heated to 125° C. | | | | | | | | | |
|---|---|---|---|---|---|---|---|---|---|
| d (Å) | 6.95 | 4.64 | 3.88 | 3.83 | 2.78 | 2.75 | 2.68 | 2.49 | 2.20 | 2.19 |
| $I/I^o$ | 40 | 20 | 35 | 100 | 8 | 15 | 30 | 4 | 4 | 5 |

When α-ZrP alone is heated to 125° C. it loses a mole of water but its X-ray pattern remains relatively unchanged. Thus, the absence of reflections due to α-ZrP or dehydrated phases of phase A indicates that the sodium ion has distributed itself statistically about the exchange sites and formed a single new phase. (A solid solution with $Na^+$ statistically distributed among the exchange sites.)

B. Stabilization of α-ZrAs with Sodium Ion To 1 g of crystalline α-ZrAs was added 50 ml of 0.1 N NaCl solution. Then 52 ml of 0.1N NaOH was added in 1 ml increments with constant stirring over a 10 hour period. The solid was then filtered off and dried at 60% relative humidity. Analysis gave 9.79% Na and 11.6% loss on ignition (to 500° C.) Required for $Zr(NaAsO_4)_2.3H_2O$:9.81% Na and 11.50% $H_2O$.

The X-ray pattern of this solid was isomorphous with that of the corresponding phase D($2Na^+.3H_2O$) of zirconium phosphate (α-ZrP). The dehydration behavior of the sodium substituted zirconium arsenate was very similar to that of the phosphate. A monohydrate was obtained at 100° C., and a water free phase at 175° C. [phase F ($2Na^+$)]. The X-ray patterns of these phases were similar to those of phase E ($2Na^+.H_2O$) and phase F($2Na^+$) of the phosphate showing that the phases are isomorphous.

C. Stabilization of α-ZrP with Potassium Ions In a manner similar to that set forth in Example IVA supra, for titration of α-ZrP with sodium ions, titration of α-ZrP with potassium ions leads to a stable two phase system. Up to 50% of the exchange is a phase designated phase A($K^+.1H_2O$), $Zr(HPO_4)(KPO_4).1H_2O$, and with the rest being unexchanged α-ZrP. Beyond the half exchange point a second two phase region consisting of varying amounts of phase A and a phase designated phase B ($2K^+.3H_2O$) are obtained.

Phase A on standing in air or heating to 150° dehydrates and forms phase B which is stable to 150°; see X-ray diffraction patterns in Table II. Phase D($2K^+.3H_2O$) forms phase E($2K^+.H_2O$) on heating at 35° C. and phase F ($2K^+$) on heating to 150° C. Further heating to 800° forms phase G ($2K^+$); see X-ray diffraction patterns in Table III.

TABLE II

X-Ray Diffraction Patterns of $Zr(KPO_4)(HPO_4) \cdot 1H_2O$ and its Dehydration Products

| Phase A | | Phase B (dried at 80°) | |
|---|---|---|---|
| d | $I/I_o$ | d | $I/I_o$ |
| 8.04 | 100 | 7.63 | 40 |
| 4.64 | 10 | 5.37 | 5 |
| 4.51 | 40 | 4.62 | 40 |
| 4.23 | 70 | 4.21 | 35 |
| | | 3.82 | 100 |
| | | 3.48 | 15 |
| 3.63 | 40 | 3.16 | 25 |
| 3.22 | 65 | 3.05 | 15 |
| 2.89 | 10 | 3.02 | 5 |
| 2.72 | 15 | 2.83 | 20 |
| 2.63 | 15 | 2.66 | 8 |
| | | 2.65 | 25 |
| | | 2.61 | 7 |
| | | 2.54 | 8 |
| | | 2.52 | 8 |
| | | 2.29 | 4 |
| | | 2.16 | 15 |
| | | 1.90 | 8 |

TABLE III

X-ray Diffraction Patterns of Fully Exchanged Potassium Form of α-ZrP and its Dehydration Products

| Phase D | | Phase E (35–75°) | | Phase G (dried 800°) | |
|---|---|---|---|---|---|
| d (Å) | $I/I_o$ | d | $I/I_o$ | d | $I/I_o$ |
| 10.8 | 100 | 8.84 | 40 | 9.21 | 60 |
| 5.37 | 5 | 4.59 | 40 | 4.04 | 100 |
| 4.56 | 30 | 4.32 | 90 | 3.19 | 90 |
| 4.53 | 60 | 4.03 | 10 | 2.60 | 45 |
| 4.33 | 50 | 3.90 | 100 | 2.50 | 5 |
| 3.80 | 60 | 3.65 | 10 | 2.24 | 3 |
| 3.72 | 5 | 3.53 | 50 | 2.18 | 10 |
| 3.65 | 30 | 3.18 | 10 | 2.01 | 25 |
| 3.23 | 5 | 3.02 | 90 | 1.96 | 15 |
| 3.07 | 55 | 2.97 | 15 | 1.80 | 5 |
| 2.96 | 20 | 2.70 | 65 | 1.67 | 10 |
| 2.71 | 40 | 2.62 | 70 | 1.59 | 6 |
| 2.65 | 45 | 2.59 | 15 | 1.48 | 6 |
| 2.63 | 15 | 2.36 | 10 | | |
| 2.40 | 5 | 2.18 | 20 | | |
| 2.26 | 10 | 1.89 | 10 | | |
| 2.09 | 10 | 1.77 | 10 | | |
| 1.90 | 5 | | | | |

| Phase F (100–260°) | |
|---|---|
| d | $I/I_o$ |
| 8.93 | 100 |
| 8.04 | 10 |
| 3.99 | 90 |
| 3.16 | 90 |
| 3.05 | 5 |
| 3.00 | 5 |
| 2.59 | 30 |
| 2.48 | 5 |
| 2.24 | 2 |
| 2.16 | 5 |
| 2.00 | 20 |
| 1.95 | 15 |

D. Stabilization of α-ZrP with Lithium Ions In a manner similar to that set forth in Example IVA supra, for titration of α-ZrP with sodium ions, titration of α-ZrP with lithium ions leads to the formation of a two phase system. However, the two phases persist up to 66% of total lithium exchange. This differs from the sodium and potassium systems where the two phase region extended only to 50% of exchange. The two phases are the original α-ZrP and $Zr(LiPO_4)_{1.33}(HPO_4)_{.67} \cdot 4H_2O$. This latter phase was designated phase A ($1.33Li^+ \cdot 4H_2O$) and its X-ray pattern is given in Table IV.

Beyond 66% of exchange another two phase region was obtained. The two phases being phase A($1.33li^+ \cdot 4H_2O$) and the fully exchanged $Zr(LiPO_4)_2 \cdot 4H_2O$. This latter phase was designated phase F($2Li \cdot 4H_2O$) and its X-ray pattern is given in Table V. The analytical results for phase A and F are given below.

Analysis of Phase A($1.33Li^+ \cdot 4H_2O$): Found: Zr, 25.3%; $PO_4$, 50.5%; Li, 2.64%; $H_2O$ (Loss of Ignition) 21.2%. Calculated for $Zr(HPO_4)_{.67}(LiPO_4)_{1.33} \cdot 4H_2O$: Zr, 25.3%; $PO_4$, 52.2%; Li, 2.55%; $H_2O$, 21.4%.

Analysis of Phase F($2Li^+ \cdot 4H_2O$): Found: Zr, 25.2%; $PO_4$, 49.8%; Li, 3.82%; $H_2O$ (loss of Ignition), 19.63%. Calculated for $Zr(LiPO_4)_2 \cdot 4H_2O$: Zr, 25.0%; $PO_4$, 51.5%; Li, 3.77%; $H_2O$, 19.57%.

The dehydration behavior for phase A was found to be quite complicated. At least 4 phases other than phase A ($1.33Li^+ \cdot 4H_2O$) hereinafter designated phases B, C, D and E, are involved.

The phases and their probable water content are listed below.

| Interlayer d Spacing | Phase | $H_2O$/Li |
|---|---|---|
| 8.55 Å | phase B ($1.33Li^+ \cdot 3 \cdot 3H_2O$) | 3.5 |
| 7.30 Å | phase C ($1.33Li^+ \cdot 1 \cdot 33H_2O$) | 1.0 |
| 7.84 Å | phase D ($1.33Li^+ \cdot 0 \cdot 67H_2O$) | 0.5 |
| 7.00 Å | phase E ($1.33Li^+$) | 0 |

Their X-ray patterns are listed in Table IV.

Phase A($1.33Li^+ \cdot 4H_2O$) loses water slowly in air at room temperature. After about 1 week, a mixture, consisting of about equal amounts of phase A, B, C and D was obtained. The same result was obtained much quicker over $P_2O_5$.

Heating a sample of phase A at 50° C. brought about the changes shown below:

| Heating Time | | 5 min. | 10 min. | 25 min. | 45 min. |
|---|---|---|---|---|---|
| Solid | phase A | 40% | 25% | | |
| phases | phase B | 30% | 25% | 30% | |
| present | phase C | 15% | 25% | 30% | 50% |
| | phase D | 15% | 25% | 40% | 50% |
| Obs. water content | | 16.7% | 15.6% | 13.0% | 7.7% |
| Calc. water content | | 16.9% | 14.4% | 11.2% | 7.7% |

Two of the above phases were isolated in relatively pure form. Heating phase A($1.33Li^+ \cdot 4H_2O$), or any of the above mixtures at 110° for 96 hrs., produced almost pure phase D. It contained about 0.6 mole, (3.76%) of water and was assigned the formula $Zr(LiPO_4)_{1.33}(HPO_4)_{.67} \cdot 67H_2O$. The water content was ½ mole per lithium atom. Heating phase D($1.33Li \cdot 67H_2O$) at 185° resulted in the loss of this 0.67 mole of water and formation of anhydrous phase E($1.33Li^+$). Phase E($1.33Li^+$) was converted to phase J at 450°. Its X-ray diffraction pattern was found to be the same as that obtained when the fully exchanged phase F is heated to 600° C. (Table V). Condensation to $LiZr_2(PO_4)_3$ occurred at 800° C. This latter phase was identified by comparison with the X-ray pattern of $NaZr_2(PO_4)_3$ with which it is isomorphous.

TABLE IV

Phases Formed by Dehydration of Lithium Phase A

| Phase A($1.33Li^+ \cdot 4H_2O$) | Phase B($1.33Li^+ \cdot 3.5H_2O$) | Phase C($1.33Li \cdot 1.33H_2O$) |
|---|---|---|

TABLE IV-continued
Phases Formed by Dehydration of Lithium Phase A

| d | I/I₀ | d | I/I₀ | d | I/I₀ |
|---|---|---|---|---|---|
| 10.1 | 100 | 8.55 | 100 | 7.30 | 50 |
| 5.05 | 10 | 4.21 | 60 | 5.49 | 5 |
| 4.56 | 10 | 4.05 | 30 | 4.51 | 85 |
| 4.35 | 5 | 3.87 | 10 | 4.01 | 10 |
| 4.21 | 5 | 3.73 | 10 | 3.62 | 70 |
| 4.11 | 12 | | | 3.49 | 100 |
| 3.89 | 20 | | | 3.24 | 5 |
| 3.66 | 5 | | | 3.14 | 5 |
| 3.59 | 6 | | | 2.70 | 15 |
| 3.55 | 8 | | | 2.66 | 30 |
| 3.41 | 5 | | | 2.57 | 10 |
| 3.30 | 10 | | | 2.38 | 5 |
| 3.23 | 5 | | | 2.17 | 5 |
| 3.10 | 10 | | | 2.08 | 5 |
| 2.99 | 5 | | | 1.85 | 5 |
| 2.83 | 5 | | | | |
| 2.71 | 5 | | | | |
| 10 more | | | | | |
| 1.94 | | | | | |

| D(1.33Li⁺ · 67H₂O) | | Phase E(1.33Li⁺) | | Phase A heated to 800° C. LiZr₂(PO₄)₃ | |
|---|---|---|---|---|---|
| d | I/I₀ | d | I/I₀ | d | I/I₀ |
| 7.84 | 100 | 7.02 | 60 | 6.39 | 45 |
| 4.35 | 5 | 4.53 | 40 | 6.28 | 15 |
| 4.24 | 5 | 3.78 | 40 | 4.55 | 100 |
| 3.23 | 5 | 3.68 | 100 | 4.48 | 15 |
| 3.01 | 5 | 3.38 | 10 | 4.44 | 30 |
| 2.73 | 5 | 2.94 | 5 | 4.40 | 35 |
| 2.03 | 5 | 2.85 | 7 | 4.37 | 30 |
| | | 2.68 | 30 | 3.83 | 35 |
| | | 2.49 | 5 | 3.79 | 35 |
| | | 2.41 | 10 | 3.19 | 30 |
| | | | | 3.17 | 30 |
| | | | | 3.11 | 25 |
| | | | | 2.88 | 25 |
| | | | | 2.86 | 20 |
| | | | | 2.54 | 25 |
| | | | | 2.52 | 10 |

Phase F(2Li⁺.4H₂O). This phase was found to undergo complicated dehydration behavior. The phases formed and their approximate water content are given below:

| | Interlayer d Spacing |
|---|---|
| Phase G(2Li⁺ . 2−3H₂O) | 8.80 Å |
| Phase H(2Li⁺ . 1H₂O) | 7.87 Å |
| Phase I(2Li⁺) | 7.05 Å |
| Phase J(2Li⁺) | 6.24 Å |

Phase F dehydrated slowly at room temperature losing about 1% water in 2 hours time at a relative humidity of 60%. A proportionate amount of phase G formed with this small water loss. However, on standing over CaSO₄ in a dessicator for 7 hours, 5.25% water was lost (1.06 moles) and complete conversion to phase G occurred. Water losses as high as 8.75% (1.77 moles) were observed (over P₂O₅) with no phase change. Allowing phase F to stand for longer periods of time over P₂O₅ resulted in mixtures of phase G and H(2Li⁺.H₂O). The latter phase was obtained free of other phases by heating phase F or G at 80° to 140° C. In one case heating phase F at 80° C. for 60 hours resulted in a loss of 2.78 moles water (13.6%). In another experiment phase F was kept at 110° for 6 days whereupon it lost 2.67 moles water (13.5%). Thus the product is close to a monohydrate or phase H(2Li⁺.H₂O).

Heating phase H at 185° C. converted it to Phase I. Approximately 1 mole of water was lost in the process. However, any temperature in the range 185°–370° C. can be used and all but traces of moisture are removed at the higher temperatures. Thus, phase I is considered to be anhydrous. Finally, heating above 450° C. converted phase I to another anhydrous phase called phase J(2Li⁺). X-ray patterns for phase J(2Li⁺) prepared at both 600° C. and 800° C. are given in Table V.

TABLE
X-ray Diffraction Patterns of Phase F(2Li . 4H₂O) and its Dehydration Products

| Phase F (2Li⁺ · 4H₂O) | | Phase G (2Li⁺ · 2−3H₂O) | | Phase H(2Li⁺ · H₂O) | |
|---|---|---|---|---|---|
| d (Å) | I/I₀ | d (Å) | I/I₀ | d (Å) | I/I₀ |
| 10.0 | 100 | 8.80 | 100 | 7.87 | 100 |
| 5.01 | 4 | 4.40 | 45 | 4.46 | 40 |
| 4.67 | 5 | 3.59 | 95 | 4.33 | 20 |
| 4.53 | 20 | 3.57 | 95 | 3.63 | 50 |
| 4.23 | 12 | 3.21 | 20 | 2.59 | 55 |
| 3.81 | 40 | 2.64 | 20 | 3.53 | 40 |
| 3.41 | 30 | 2.61 | 20 | 3.23 | 10 |
| 3.03 | 30 | 2.42 | 5 | 2.73 | 7 |
| 2.67 | 30 | 2.21 | 20 | 2.68 | 8 |
| 2.48 | 4 | 2.13 | 5 | 2.57 | 7 |
| 2.42 | 4 | 2.04 | 8 | 2.55 | 7 |
| 2.10 | 8 | 2.00 | 8 | 2.40 | 5 |
| 2.00 | 10 | | | | |
| 1.90 | 8 | | | | |
| 1.70 | 10 | | | | |

| Phase I(2Li⁺) | | Phase J(2Li⁺) at 600° C. | | at 800° C. | |
|---|---|---|---|---|---|
| d (A) | I/I₀ | d | I/I₀ | d | I/I₀ |
| 8.11 | 5 | 6.24 | 10 | 6.19 | 10 |
| 7.05 | 65 | 5.57 | 8 | 5.61 | 10 |
| 4.56 | 35 | | | 4.46 | 20 |
| 4.35 | 5 | 4.41 | 100 | 4.41 | 100 |
| 4.03 | 5 | | | 3.98 | 10 |
| 3.87 | 25 | 3.95 | 10 | 3.96 | 15 |
| 3.65 | 100 | | | 3.82 | 5 |
| 3.26 | 10 | 3.78 | 30 | 3.76 | 15 |
| 3.16 | 5 | | | 3.75 | 35 |
| 2.95 | 30 | | | 3.73 | 30 |
| 2.75 | 10 | 3.59 | 5 | 3.57 | 5 |
| 2.42 | 15 | | | 3.46 | 5 |
| 2.18 | 12 | 3.44 | 5 | 3.44 | 5 |
| 2.03 | 7 | 3.35 | 7 | 3.35 | 10 |
| | | 3.14 | 30 | 3.14 | 20 |
| | | 3.07 | 12 | 2.10 | 40 |
| | | 3.03 | 5 | 3.04 | 5 |
| | | 2.84 | 10 | 2.84 | 5 |
| | | | | 2.77 | 5 |
| | | 2.74 | 7 | 2.75 | 8 |
| | | 2.64 | 5 | | |
| | | 2.55 | 25 | 2.55 | 15 |
| | | | | 2.54 | 30 |
| | | 2.20 | 5 | 2.20 | 5 |
| | | 1.98 | 10 | 1.98 | 8 |
| | | | | 1.97 | 13 |
| | | 1.96 | 10 | 1.96 | 15 |

E. Stabilization of TiP with Sodium Ions To 1 gram of titanium phosphate, Ti(HPO₄)₂.H₂O, is added 50 ml 0.1 N NaCl as supporting electrolyte. Then 0.1 M NaOH (78 ml) is added in small increments (24 hrs.) until the second end point is attained. The solid was then filtered off and dried at 60% relative humidity. The composition of the solid was Ti(NaPO₄)₂.3H₂O and its X-ray pattern shows that it is isomorphous with the corresponding zirconium compound. On dehydration it underwent substantially the same phase transitions as the corresponding zirconium compound.

EXAMPLE V

Preparation of New Synthetic Ion Exchange Materials

A. One gram of α-ZrP was slurried with 100 ml of 0.1 N NaCl and titrated to the second end point with 0.1 M NaOH. (66.4 ml). The solid was then filtered off and heated at 600° C. for 1 hour. The crystals, after this treatment, exhibited the x-ray pattern of phase G (2Na+) in Table VI. The exchanged heat treated crystals were then washed with 0.5 M HCl to remove all the sodium ion. The x-ray pattern was then that of the original α-ZrP showing that no permanent change in the crystal lattice had occurred. However, when the experiment was repeated and the exchanged crystals heated to 800°, a phase transformation occurred. The new phase gave the x-ray pattern of phase H (2Na+) in Table VI. Now however, when the Na+ was removed from the heat treated structure by washing with HCl, a new hydrogen containing phase was obtained. Its x-ray pattern is given as No. 1 in Table VII.

The exchange reaction need not be carried to completion. If some of the hydrogen atoms are allowed to remain in the crystals, then, on heating, condensation occurs according to the equation:

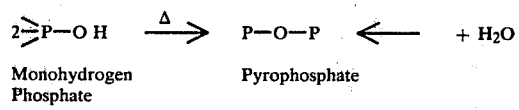

Monohydrogen Phosphate → Pyrophosphate + H₂O

This produces pyro-phosphate linkages statistically distributed throughout the crystal. Thus, by controlling the amount of cation exchanged into the lattice, it is possible to control the amount of condensation and thereby the structure of the resultant ion exchange phase.

This method can be applied to all the synthetic materials set forth supra.

EXAMPLE V
X-Ray Patterns of Sodium Exchanged α-ZrP
Fully Exchanged Anhydrous Phases

| Temp. 600° C. Phase G (2 Na+) | | High temp. (800°) Phase H (2 Na+) | |
|---|---|---|---|
| d | $I/I_o$ | d | $I/I_o$ |
| 7.63 | 100 | 7.60 | 100 |
| 4.51 | 60 | 7.17 | 8 |
| 4.35 | 20 | 6.33 | 6 |
| 4.09 | 40 | 5.74 | 5 |
| 3.85 | 20 | 4.98 | 8 |
| 3.74 | 75 | 4.55 | 18 |
| 3.53 | 10 | 4.40 | 25 |
| 2.90 | 20 | 4.35 | 44 |
| 2.65 | 50 | 4.30 | 42 |
| 2.52 | 35 | 4.19 | 22 |
| | | 4.05 | 3 |
| | | 3.90 | 40 |
| | | 3.86 | 55 |
| | | 3.79 | 55 |
| | | 3.65 | 22 |
| | | 3.49 | 35 |
| | | 3.39 | 30 |
| | | 3.36 | 28 |
| | | 3.31 | 31 |
| | | 3.16 | 14 |
| | | 2.95 | 14 |
| | | 2.89 | 18 |
| | | 2.88 | 35 |
| | | 2.82 | 25 |
| | | 2.64 | 55 |
| | | 2.53 | 30 |

TABLE VII
New Ion Exchanger Prepared By Heat Treating Exchanged α-ZrP
Phase H Heated to 800° C. Followed By Washing With HCl

| d | $I/I_o$ |
|---|---|
| 7.73 | 100 |
| 4.56 | 15 |
| 4.48 | 15 |
| 4.40 | 22 |
| 4.27 | 5 |
| 4.09 | 10 |
| 3.82 | 25 |
| 3.75 | 12 |
| 3.58 | 10 |
| 3.29 | 8 |
| 3.24 | 10 |
| 3.17 | 8 |
| 2.88 | 10 |
| 2.66 | 15 |
| 2.64 | 25 |
| 2.58 | 10 |
| 2.55 | 10 |

EXAMPLE VI

Solid State Ion Exchange

A. With α-ZrP The following equation illustrates the solid-state reaction of a salt with crystalline compounds such as α-zirconium phosphate:

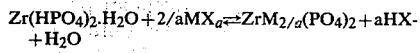

$$Zr(HPO_4)_2 \cdot H_2O + 2/a\,MX_a \rightleftharpoons ZrM_{2/a}(PO_4)_2 + aHX + H_2O$$

wherein M is a metal ion, X is an anion such as a halogen, and a is the valence of M.

1. Lithium Ion—Anhydrous lithium chloride (0.2 moles) was ground together with crystalline α-ZrP (0.1 mole) at room temperature. The odor of HCl was detected and a small amount of Li+ exchanged solid formed. On heating to 130° C. for 1 hour complete exchange occurred as evidenced by the change in X-ray pattern. The product was identified as $Zr(LiPO_4)_2 \cdot H_2O$. This resembles phase H. (See Table VIII for identifying X-ray patterns).

2. Sodium Ion—Using NaCl at 125° C. a mixture of three partially exchanged phases was obtained. At 375° C. the product was found to be phase G, $Zr(NaPO_4)_2$.

3. Aluminum Ion—Anhydrous aluminum chloride was mixed with α-ZrP crystals in the ratio of 2 moles aluminum to 3 moles of a α-ZrP exchanger. The mixture was heated at 125° C. for 1 hour to give the X-ray pattern in Table IX(a). This product appears to be a mixture of two exchanged phases with interlayer spacings of 8.04 Å and 7.38 Å, respectively. Continued heating at 125° produced the X-ray pattern in Table IX(b).

4. Copper (II) Chloride—Anhydrous copper (II) chloride (1.68 g) was mixed with α-ZrP (3.77 g) at room temperature. The mole ratio is 1 to 1. If the reaction were $CuCl_2 + Zr(HPO_4)_2 \cdot H_2O \rightleftharpoons ZrCu(PO_4)_2 + 2HCl + H_2O$ then a 20.9% loss in weight should occur. The results of heating this mixture were as follows:

| Temp. | Time (hrs.) of heating | % wt. loss | Color of Product | Interlayer Spacing of Product (A) |
|---|---|---|---|---|
| 125° | 24 | 4.9 | Brown | 7.41 + $CuCl_2$ |
| 200° | 48 | 5.6 | Green | 7.41 + $CuCl_2$ |
| 260° | 24 | 15.66 | Blue | 7.87 |
| 330° | 12 | 20.8 | Blue | 7.87 |

The X-ray patterns are given in Table X. The product obtained at 330° C. is apparently $ZrCu(PO_4)_2$.

5. Utilizing a similar solid-state procedure, other salts gave the following results:

| Salt | Temp. (°C.) | Time (hrs.) | Result | Interlayer Dist. (A) |
|---|---|---|---|---|
| $MnCl_2$ | 160° | 12 | | 7.41* |
| $MnCl_2$ | 200°–400° | 12 | Two Phases Yellow colored | 7.41 + 5.57 |
| $FeCl_3 \cdot 6H_2O$ | 200°–400° | 24 | Solid | 7.41 |
| $CoCl_2$ | 160° | 48 | Blue colored Solid | 7.41 |
| $CoCl_2$ | 375° | 12 | Purple Solid | 7.87 |
| $ZnCl_2$ | 370° | 48 | Grey Solid | 7.87 + 7.41 |
| $SnBr_2$ | 200° | 24 | Partial Reaction | 7.41 |
| $NiCl_2$ | 110°–400° | 8 | Orange Solid | 7.41 |
| $Ce(NO_3)_3$ | 190° | 6 | Yellow Solid | 7.41 |
| $HgCl_2$ | 115° | 48 | Partial Reaction | 7.41 |

*The 7.41 Å and the 7.87 Å phases have variable metal content from partially exchanged to fully exchanged. All of the 7.41 Å patterns show that the phases are isomorphous but not identical since the intensities are different. The same was found to be true of the 7.87 phases.

B. With SnP—3 g of the tin phosphate prepared as in IIIB, above, was thoroughly mixed with 5 g of NaCl and pressed into a disk at 5000 PSI. The disk was heated at 100° for 4 hours, then 200° for 8 hours. At the end of this heating period the solid was cooled and excess NaCl removed by dissolving in water. The solid tin phosphate was found to contain 2.9% Na on an anhydrous basis. This shows that roughly 22% of the exchangable hydrogen ion was replaced by sodium ion.

The above list is diverse enough to show that almost any cation can be exchanged by finding the proper solid. Amorphous gels appear to behave in a similar manner. That true exchange has occurred can be shown by washing out the cation with dil. acid and recovering α-ZrP. It is also possible to pass gaseous HCl over the solid. The protons diffuse into ZrP and the cations form chloride salts on the surface of ZrP which may be recovered by sublimation or solvent extraction and recrystallization.

TABLE VIII

X-Ray Diffraction Pattern of $Zr(LiPO_4)_2 \cdot H_2O$

| d | $I/I_o$ |
|---|---|
| 7.90 | 100 |
| 4.77 | 5 |
| 4.41 | 50 |
| 4.29 | 25 |
| 4.20 | 8 |

TABLE VIII-continued

X-Ray Diffraction Pattern of $Zr(LiPO_4)_2 \cdot H_2O$

| d | $I/I_o$ |
|---|---|
| 3.60 | 65 |
| 3.56 | 75 |
| 3.50 | 60 |
| 3.22 | 15 |
| 3.09 | 5 |
| 2.71 | 10 |
| 2.66 | 8 |
| 2.54 | 5 |
| 2.40 | 5 |
| 2.21 | 5 |
| 2.15 | 5 |
| 2.06 | 5 |
| 2.01 | 5 |
| 1.99 | 5 |

TABLE IX

X-Ray Diffraction Patterns of Solid-State Aluminum Exchanged ZrP

| a. Prepared at 125° (1hr) | | b. Prepared 130° (24hrs) | |
|---|---|---|---|
| d | $I/I_o$ | d | $I/I_o$ |
| 8.04 | 85 | 7.41 | 100 |
| 7.38 | 75 | 4.55 | 35 |
| 4.53 | 45 | 4.23 | 40 |
| 4.44 | 40 | 3.72 | 80 |
| 4.04 | 45 | 3.20 | 10 |
| 3.93 | 100 | 3.04 | 5 |
| 3.65 | 15 | 2.74 | 5 |
| 3.54 | 65 | 2.64 | 10 |
| 3.10 | 15 | 2.60 | 8 |
| 3.07 | 10 | 2.34 | 15 |
| 3.00 | 30 | 2.12 | 5 |
| 2.64 | 70 | 1.86 | 5 |
| 2.18 | 5 | | |
| 2.04 | 5 | | |
| 1.97 | 5 | | |

TABLE X

X-Ray Diffraction Patterns of Copper Exchanged ZrP

| Prepared at 200° (48 hrs) | | Prepared at 330° (12 hrs) | |
|---|---|---|---|
| d | $I/I_o$ | d | $I/I_o$ |
| 7.41 | 100 | 7.87 | 20 |
| 4.55 | 15 | 6.61 | 15 |
| 4.23 | 5 | 4.67 | 25 |
| 3.71 | 25 | 4.25 | 35 |
| 3.55 | 10 | 3.93 | 20 |
| 2.73 | 5 | 3.65 | 100 |
| 2.63 | 20 | 3.45 | 10 |
| 2.12 | 5 | 3.34 | 5 |
| | | 3.19 | 10 |
| | | 2.89 | 20 |
| | | 2.76 | 5 |
| | | 2.55 | 30 |
| | | 2.53 | 20 |
| | | 2.40 | 5 |
| | | 2.32 | 5 |
| | | 2.26 | 10 |
| | | 2.21 | 5 |
| | | 2.11 | 10 |
| | | 1.97 | 8 |
| | | 1.93 | 8 |
| | | 1.83 | 8 |
| | | 1.71 | 5 |

EXAMPLE VII

Solid-State Ion Exchange Variations

Although it is possible to exchange polyvalent cations into zirconium phosphate by the solid-state technique as in Example VIA, supra, it is sometimes advantageous to first prepare the sodium, potassium or lithium form by either the titration method or the solid-state technique and then to replace the alkali metal by a polyvalent cation. This is illustrated by the following:

The lithium exchanged form of zirconium phosphate, $Zr(LiPO_4)_2.H_2O$, was prepared as in Example VIA1. One gram of this phase was then added to 50 ml of a 0.5 M $CuCl_2$ solution filtered off and reimersed in 50 ml. of 0.5 M $CuCl_2$. The lithium ion was completely replaced by $Cu^{++}$ to form a hydrated copper zirconium phosphate, $ZrCu(PO_4)_2.XH_2O$. Its X-ray powder pattern is shown in Table XI. The same phase is formed when the 7.87 phase (Table X) is immersed in water. On dehydration the 9.35 phase reverts to the 7.87 phase.

EXAMPLE VIII

Replacement of one cation by another cation

To 1 g of phase D (2 $Na^+.3H_2O$) prepared as in Example IVA2 was added 50 ml of a 0.5 M solution of $MnCl_2$. The mixture is stirred for one hour, filtered and dried over $P_2O_5$. 22% of the original $Na^+$ was found to have been replaced by $Mn^{++}$. Further treatment of this product by fresh solutions of $MnCl_2$ resulted in additional replacement of $Na^+$ by $Mn^{++}$ until all of the sodium ion was replaced by $Mn^{++}$.

EXAMPLE IX

Ion Exchange in Non-Aqueous Media

In previous examples it has been illustrated that the exchanger phase is stabilized by replacement of hydrogen ion by metal cations either in aqueous solution or in the solid state. It is also possible to accomplish the same end result by carrying out the ion exchange in non-aqueous solvent such as alcohols, ethers, esters, etc. In some cases the resulting products are different than those obtained in aqueous solution or by the solid exchange method. Thus, other novel compositions useful as catalysts are obtained.

A. Ethanol Media 16.2 g of $FeCl_3$ was added to 200 ml of dry ethanol. After the iron(III) chloride dissolved, $\alpha$-ZrP (30 g) was added with stirring to the alcohol solution. The mixture was then refluxed for 12 hours and the resultant solid filtered off. It was washed with ethanol and dried under vacuum at 50° C. The dried solid was orange brown in color and contained 2.4% Fe. This represents a 20% replacement of hydrogen ions by $Fe^{+++}$ ions. The amount of hydrogen ions replaced may be further increased by filtering off the solid and adding a fresh solution of $FeCl_3$ dissolved in alcohol. By such successive treatments it is possible to incorporate close to the theoretical amount of $Fe^{+++}$ into the exchanger i.e., 6.64 meq of cation per gram of $\alpha$-ZrP. However, it has been found to be more advantageous to use the ammonium exchanged form of $\alpha$-ZrP which on treatment with $FeCl_3$ dissolved in alcohol now replaces almost 80% of the ammonium ions as in the example below.

B. Ethanol Media 30 g of $\alpha$-ZrP are added with stirring to a concentrated ammonium hydroxide solution. This treatment brings about 100% replacement of $H^+$ by $NH_4^+$ as shown in the following equation:

$$Zr(HPO_4)_2.H_2O + 2NH_4OH \rightleftharpoons Zr[(NH_4)PO_4]_2.H_2O + 2H_2O$$

The solid is filtered off and dried over phosphorus pentoxide. The dry solid was then slurried with 100 ml of dry ethanol and added to a solution of 16.2 g $FeCl_3$ in 200 ml of dry ethanol. The mixture was then refluxed for twelve hours and the solid recovered by filtration. This solid was found to contain 7.7% Fe, 13% $C_2H_5OH$ and 4.5% $NH_4^+$. This corresponds roughly to the formula $Zr(Fe)_{\frac{1}{3}}(NH_4)_{\frac{1}{3}}(PO_4)_{\frac{1}{3}}.C_2H_5OH$. On heating to 250° the alcohol splits out and at 350° ammonia splits leaving a product of composition $Zr(Fe)_{\frac{1}{3}}(H_{\frac{1}{2}})(PO_4)_2$.

In all of the foregoing examples the acid form of the ion exchanger had the formula $M(HQO_4)_2.xH_2O$. However it sometimes happens, due to hydrolysis, that some of the $(HQO_4)$ groups are replaced by hydroxyl groups to form compounds of composition $M(OH)_z(HQO_4)_{2-z/2}.xH_2O$ where z varies from 0 to 2. Such compositions undergo exchange in the same way as the parent compounds $M(HQO_4).xH_2O$ and thereby produce exchanged phases of composition $M(OH)_zY_{\prime}^{m+}(QO_4)_{2-z/2}.xH_2O$. When z is small these phases have the same x-ray patterns as the corresponding parent compounds with $z=0$. However when z approaches 2 the phases tend to become amorphous.

EXAMPLE X

Preparation of $\alpha$-ZrP containing hydroxyl groups 10 g of the $\alpha$-ZrP prepared in Example IA was added to 500 ml of water made slightly alkaline (pH=9) by addition of NaOH. This mixture was boiled under reflux for 3 days, cooled and the solid recovered by filtration. The solid was washed with 1 N HCl until free of sodium ion followed by washing with water until free of chloride ion. The solid was then dried 3 days over $P_2O_5$ and analyzed. Found: 40.6% $ZrO_2$, 43.5% $P_2O_5$ and 15.0% Loss on ignition. Required for $Zr(OH)_{0.28}(HPO_4)_{1.88}$ 1.6 $H_2O$; 40.8% $ZrO_2$, 43.5% $P_2O_5$, 15.8% total $H_2O$. In the above formula $z=0.28$. The X-ray powder pattern of the solid was substantially the same as given in Table I for $\alpha$-ZrP.

The partially hydrolyzed $\alpha$-ZrP was exchanged with sodium ions in much the same manner as detailed in Example IVA. The phases obtained after exchange gave X-ray patterns similar to those formed from $\alpha$-ZrP. On heating they behaved in the same way as described for the exchange phases of $\alpha$-ZrP except that above 500° C. the partially hydrolyzed product split out substantially 0.14 moles of water due to the condensation of 0.28 moles of hydroxyl groups present in the solid.

EXAMPLE XI

Utility of Metal Substitute Phase

The metal substituted inorganic ion exchange phases described herein are useful as catalysts. To illustrate this point the following examples are offered.

A. 1 g of copper zirconium phosphate, $ZrCu(PO_4)_2$, prepared by the reaction of $CuCl_2$ with $Zr(HPO_4)_2.H_2O$ ($\alpha$-ZrP) at 330° and having the X-ray pattern of the 7.87 phase in Table X was added to a slurry of 1 g of asbestos in 50 ml of water. The mixture was vigorously agitated and then the water evaporated by heating at about 70° C. By this procedure the copper zirconium phosphate particles were made to adhere to the asbestos fibers. The solid was then loosely packed into a U tube fitted with gas inlet and outlet tubes. The U tube was placed into a furnace in the verticle position and a mixture of air and carbon monoxide led into a pre-heater to warm the gases and then into the U tube and passed over the copper zirconium phosphate. The exit gases were passed into a gas chromatograph so that they could be identified. The results were given below.

| Temp. | Flow Rate | CO-Air Ratio | Products |
|---|---|---|---|
| 250° | 8 ml/min | 1-3 | 75% $CO_2$ + 25% CO |
| 300° | 8 ml/min | 1-10 | 100% $CO_2$ |
| 300° | 12 ml/min | 1-1 | 70% $CO_2$ + 30% CO |

It is evident that the catalyst is effective in converting CO to $CO_2$. This reaction is important as it is often desirable to prevent CO (from various combustion processes as in automobile exhausts) from escaping into the air.

It is also desirable to prevent hydrocarbons in automobile exhaust gases from escaping into the atmosphere. A particularly difficult hydrocarbon to oxidize is methane. However, when a 1-5 mixture of methane and air was passed over the copper zirconium phosphate catalyst at 500° and 4 ml/min 50% was converted to $CO_2$ and $H_2O$. Thus, it is apparent that this catalyst will be effective in converting hydrocarbons, their partially oxidized derivatives such as alcohols and carboxilic acids and carbon monoxide into harmless products such as $CO_2$ and $H_2O$.

When $\alpha$-ZrP was used instead of the $Cu^{++}$ substituted form, no oxidation was observed to occur.

B. A major air polluter is sulfur dioxide. This product always results from the burning of coal or petroleum as these fuels contain varying amounts of sulfur containing compounds. When a mixture of $SO_2$ and air was passed over the copper zirconium phosphate catalyst, it was converted to sulfur trioxide as shown below.

| Temp. | Flow Rate | $SO_2$-Air Ratio | Products |
|---|---|---|---|
| 300° C. | 6 ml/min | 1-5 | 50% $SO_3$ + 50% $SO_2$ |
| 500° C. | 10 ml/min | 1-5 | 70% $SO_3$ + 30% $SO_2$ |

The sulfur trioxide is easily condensed out of the gas stream and dissolved in water to form sulfuric acid which is a useful article of commerce.

C. When cobalt zirconium phosphate, $ZrCO(PO_4)_2$, was used in place of the copper salt substantially the same result was obtained. Thus it is evident that a wide variety of metal substituted zirconium phosphates (and other inorganic ion exchangers) may be used as oxidation catalysts.

TABLE XI

| Hydrated Copper Zirconium Phosphate | |
|---|---|
| d | $I/I_o$ |
| 9.35 | 35 |
| 5.37 | 15 |
| 4.72 | 60 |
| 4.53 | 80 |
| 4.37 | 90 |
| 4.13 | 100 |
| 3.89 | 15 |
| 3.53 | 60 |
| 3.28 | 20 |
| 3.07 | 50 |
| 2.78 | 25 |
| 2.63 | 70 |

EXAMPLE XII

Separation of Ions by Solid-Solid Ion Exchange

Three grams (~ 0.0178 moles) of cesium chloride and 0.85 g (~ 0.02 moles) of lithium chloride were dissolved in 50 ml of water. The solution was then evaporated to dryness so as to obtain an intimate mixture of the two salts. This salt mixture was then intimately mixed with 5 g of $\alpha$-ZrP crystals and heated to 125° for 5 hours followed by heating at 250° for 2 hours. Then, the cooled solid was extracted with water to dissolve the unexchanged salts. These were recovered by evaporation to dryness and x-rayed. The x-ray pattern was that of CsCl with a trace of LiCl. The zirconium phosphate solid was found to contain 0.13 g Li or 94% of the lithium in the original LiCl. Thus the lithium was effectively separated from the cesium.

This separation was the result of the zeolitic nature of $\alpha$-ZrP [A. Clearfield and G. David Smith, Inorg. Chem. 8, 431 (1969]. The entrance ways into the cavities are large enough to admit a spherical ion of 2.66 Å diameter into the cavity. Larger ions are excluded. Thus $Li^+$ whose diameter is 1.20 Å is readily admitted but $Cs^+$ with a diameter of 3.38 Å is excluded. Although the openings into the cavities are not known for the other compounds of the type $M(HQO_4)_2 \cdot XH_2O$ it is reasonable to expect that they vary from compound to compound because of the differences in atomic radii of M and Q. Thus, the subject compounds constitute a series of ionic sieves whereby ions may be separated by their size differences as shown in the above example.

Although the foregoing invention has been described in some detail by way of illustration and example for purposes of clarity of understanding, it is understood that certain changes and modifications may be practiced within the spirit of the invention as limited only by the scope of the appended claims.

What is claimed is:

1. A process for modifying the interlayer spacing of an inorganic compound of the formula

to produce a product of the formula

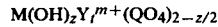

wherein M is zirconium S is water or a non-aqueous solvent, Q is phosphorus z is a number from 0 to 2 including fractional values, x is an integer of from 0 to 8, Y is a cation of groups IA-IVA, IB-VIIB, VIII, including lanthanide and actinide series, or ammonium, mt is an integer corresponding to the charge of a cation Y, and t is a number such that mt equals 2-z/2, wherein at least 10 mole percent of said inorganic compound is converted to said product;

said method comprising mixing said inorganic compound in finely divided dry form with a finally divided solid salt of cation Y, which is other than M; and heating said mixture at an elevated temperature for a time sufficient to incorporate said salt cation Y into said inorganic compound by displacing at least some of the replaceable hydrogen ions to produce said product and thereby modify the interlayer spacing while retaining the crystalline nature of the compound structure.

2. A process in accordance with claim 1 wherein said temperature elevation is in excess of 100° C.

3. A process in accordance with claim 1 wherein said mixing is preceded by a preliminary displacement with dissimilar cations.

4. A process in accordance with claim 3 wherein said temperature elevation is in excess of 100° C.

5. A process according to claim 1, wherein Y is an alkali metal.

6. A process according to claim 1, wherein Y is an alkaline earth metal.

7. A product formed by the process of claim 1.

* * * * *

UNITED STATES PATENT AND TRADEMARK OFFICE
CERTIFICATE OF CORRECTION

PATENT NO. : 4,180,551
DATED : December 25, 1979
INVENTOR(S) : ABRAHAM CLEARFIELD It is certified that error appears in the above-identified patent and that said Letters Patent are hereby corrected as shown below:

Insert as a new paragraph in Column 1, after line 4

--The Government has rights in this invention pursuant to grants CHE75-22950, G.P. 36002 awarded by the National Science Foundation.--

Signed and Sealed this

Fifteenth Day of July 1980

[SEAL]

Attest:

SIDNEY A. DIAMOND

Attesting Officer

Commissioner of Patents and Trademarks